United States Patent [19]

Frahm et al.

[11] Patent Number: 5,762,317
[45] Date of Patent: Jun. 9, 1998

[54] CHILD RESISTANT VALVE ASSEMBLY

[75] Inventors: Shirley Frahm; Carl Frahm, both of Arcadia, Calif.

[73] Assignee: Reid Plastics, Inc., Arcadia, Calif.

[21] Appl. No.: 643,175

[22] Filed: May 6, 1996

[51] Int. Cl.$^6$ .................................................. F16K 35/02
[52] U.S. Cl. ............................ 251/95; 222/505; 251/105
[58] Field of Search ............................ 137/801; 251/95, 251/102, 104, 105, 110, 106; 74/552, 553, 554, 557; 222/505, 544, 559

[56] References Cited

U.S. PATENT DOCUMENTS

| | | | |
|---|---|---|---|
| 2,678,147 | 5/1954 | Abplanalp | 251/95 |
| 3,138,331 | 6/1964 | Kutik | 251/89 |
| 3,169,672 | 2/1965 | Soffer et al. | 251/95 |
| 3,401,843 | 9/1968 | Ahrens et al. | 251/95 |
| 4,015,632 | 4/1977 | Frahm et al. | 137/801 |
| 4,203,572 | 5/1980 | Coffman | 251/95 |
| 5,183,073 | 2/1993 | Roberts | 251/110 |
| 5,213,308 | 5/1993 | Jeromson et al. | 251/95 |
| 5,449,144 | 9/1995 | Kowalics | 251/104 |
| 5,470,044 | 11/1995 | Chi | 251/102 |

*Primary Examiner*—George L. Walton
*Attorney, Agent, or Firm*—Lyon & Lyon LLP

[57] ABSTRACT

A child resistant valve assembly includes a valve with a movable valve stem to regulate the flow of hot water from a bottled water cooler system. An actuator cap is mounted to the movable valve stem, and a hood assembly covers the actuator cap. The hood assembly can slide in a direction generally perpendicular to the direction of movement of the movable valve stem. A spring, generally connected to the side of the actuator cap, lies between the actuator cap and the inside of the hood assembly. The hood assembly includes downwardly projecting tabs. The spring biases the hood assembly toward a position such that the tabs are located directly above the annular upper surface of the valve. Downward motion of the valve stem is thus prevented. When the hood assembly is first moved laterally to allow the stoppers to pass to a position not directly above the upper surface of the valve, the valve stem can be pushed down allowing hot water to be dispensed.

14 Claims, 7 Drawing Sheets

CHILD RESISTANT VALVE ASSEMBLY

FIELD OF THE INVENTION

The present invention is directed to a child resistant valve assembly.

BACKGROUND OF THE INVENTION

Bottled water coolers are commonly used in businesses and homes. Such water coolers can often dispense both hot and cold water. Conventionally, cold water is dispensed from a spout with a white or blue cap. Hot water, on the other hand, flows from a red-capped outlet. Even with this visual warning, however, it remains necessary to prevent young children from operating the hot water spout and inadvertently scalding themselves. Thus, there is a need for a child resistant valve assembly.

SUMMARY OF THE INVENTION

To these ends, a child resistant valve assembly has a valve preferably including valve stem which moves in a direction of actuation of the valve from a closed position to an open position. An actuator cap is advantageously mounted to the movable valve stem. A hood assembly is mounted over the actuator cap to slide in a direction perpendicular to the direction of actuation from a disabling position to an enabling position. A biasing element is most desirably disposed between a side of the actuator cap and the inside of the hood assembly, urging the hood assembly to the disabling position. In a preferred embodiment, inwardly projecting stoppers on the hood assembly are located above an upper surface of the valve when the hood assembly is in the disabling position. The stoppers prevent movement of the valve member. However, when the hood assembly is slid to the enabling position, the member is free to move.

In a separate aspect of the invention, the hood assembly can include a lower tongue portion with a slot. The slot encircles the valve, securing the hood assembly to the valve yet allowing the hood assembly freedom of lateral movement.

In another aspect of the invention, the hood assembly can include a sloping surface to facilitate lateral movement of the hood assembly. The valve assembly may be used to dispense hot or cold water, coffee, and various other liquids, while resisting inadvertent operation by children.

BRIEF DESCRIPTION OF THE DRAWINGS

These and other features, aspects, and advantages of the present invention will become better understood with regard to the following description and accompanying drawings wherein.

DETAILED DESCRIPTION OF THE PREFERRED EMBODIMENT

Figure 1:
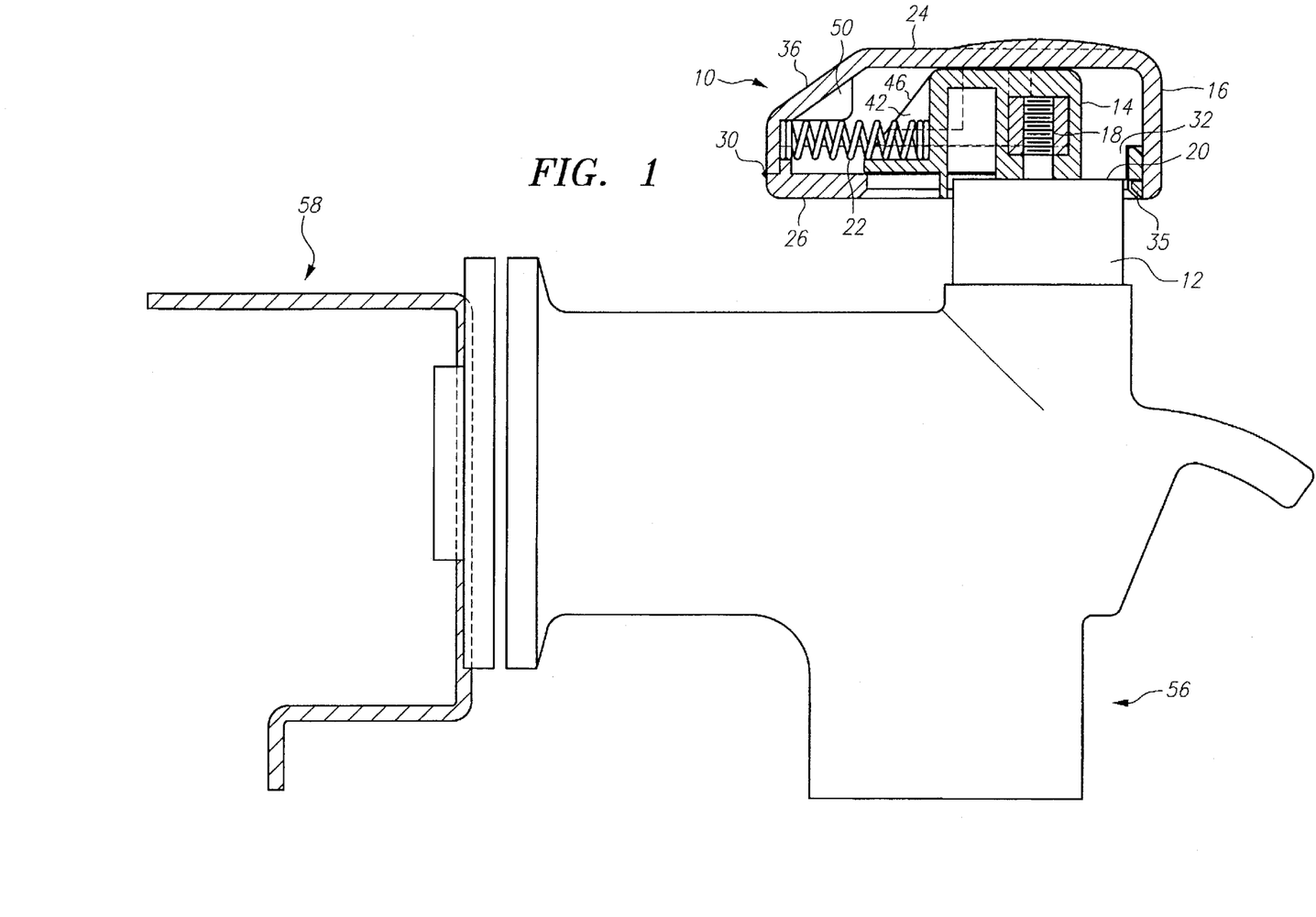
FIG. 1 is a cross-section view from the right side of a the present valve.

Referring to FIG. 1, a child resistant valve assembly 10 includes a valve 12, and an actuator cap 14 mounted to the valve 12, as shown in U.S. Pat. No. 4,015,632, incorporated herein by reference. A hood assembly 16 is mounted over the actuator cap 14, and a biasing element or spring 22 is positioned between the hood assembly 16 and the actuator cap 14. The valve 12 has a movable valve stem 18 that directly or indirectly regulates the flow of liquid in a well known manner.

Figure 2:
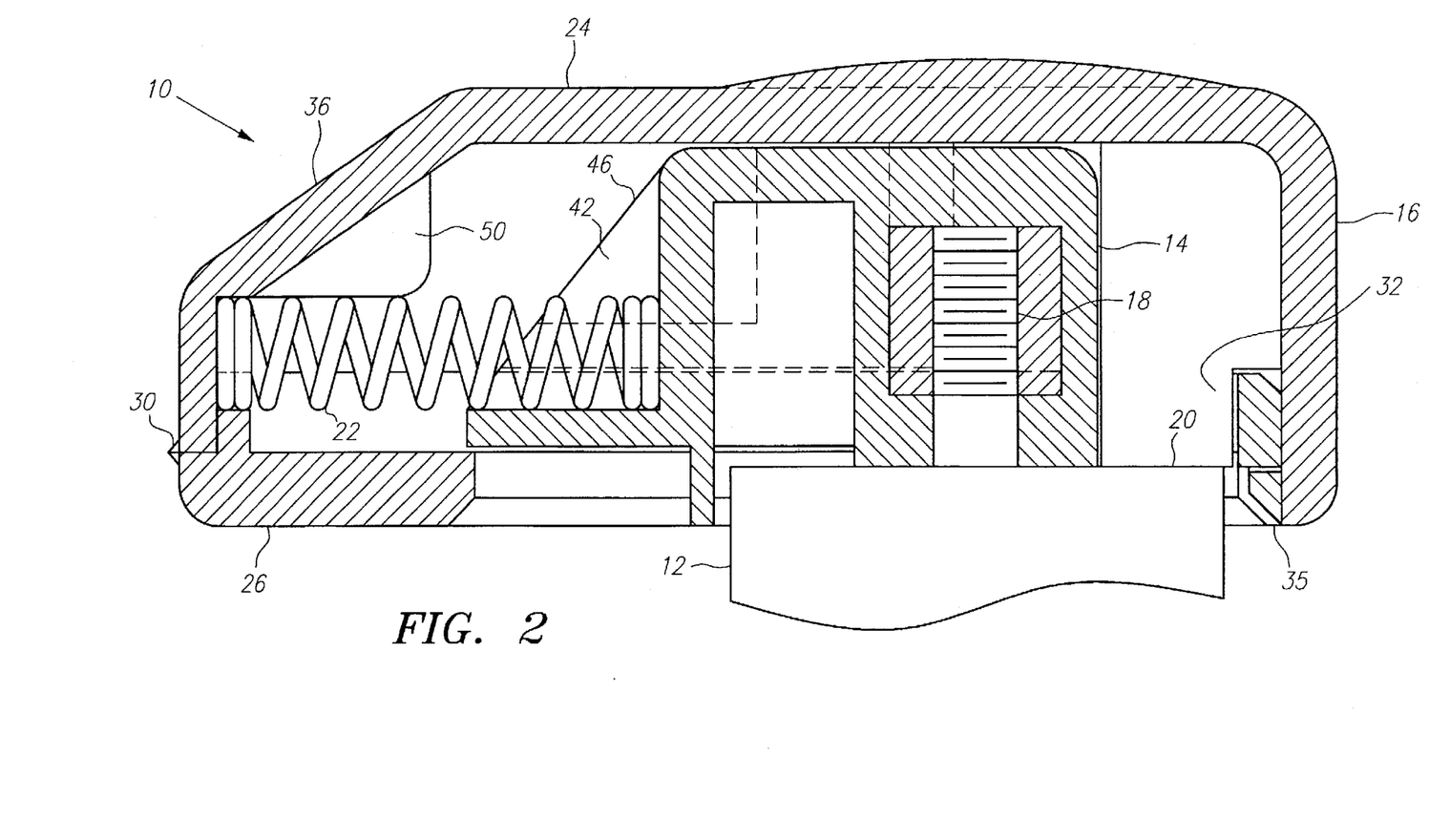
FIG. 2 is a cross-section view from the right side of the valve assembly of FIG. 1.
Figure 3:
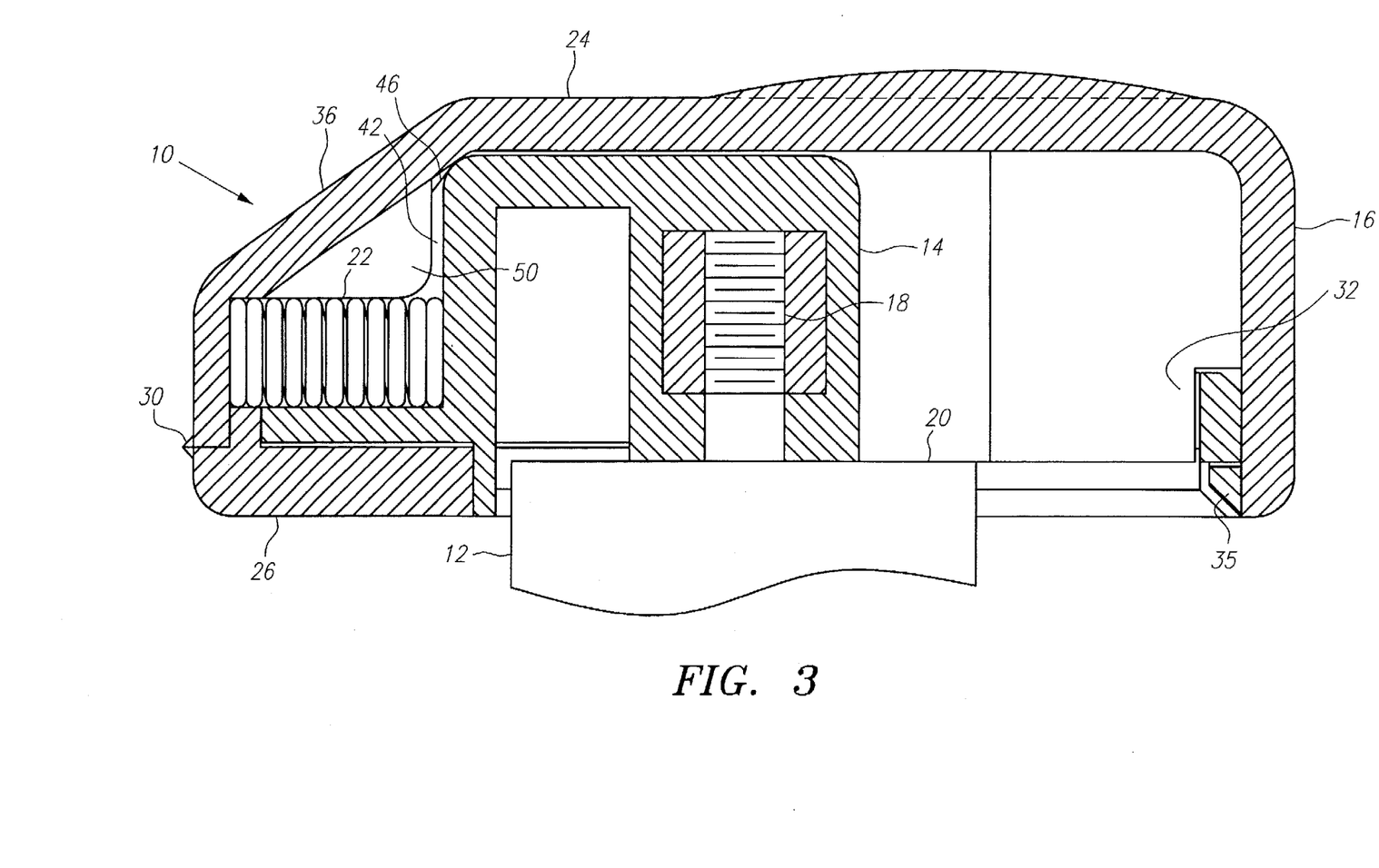
FIG. 3 is a cross-sectional view from the right of the apparatus of FIG. 1, with the hood assembly shown in the enabling position.
Figure 6:
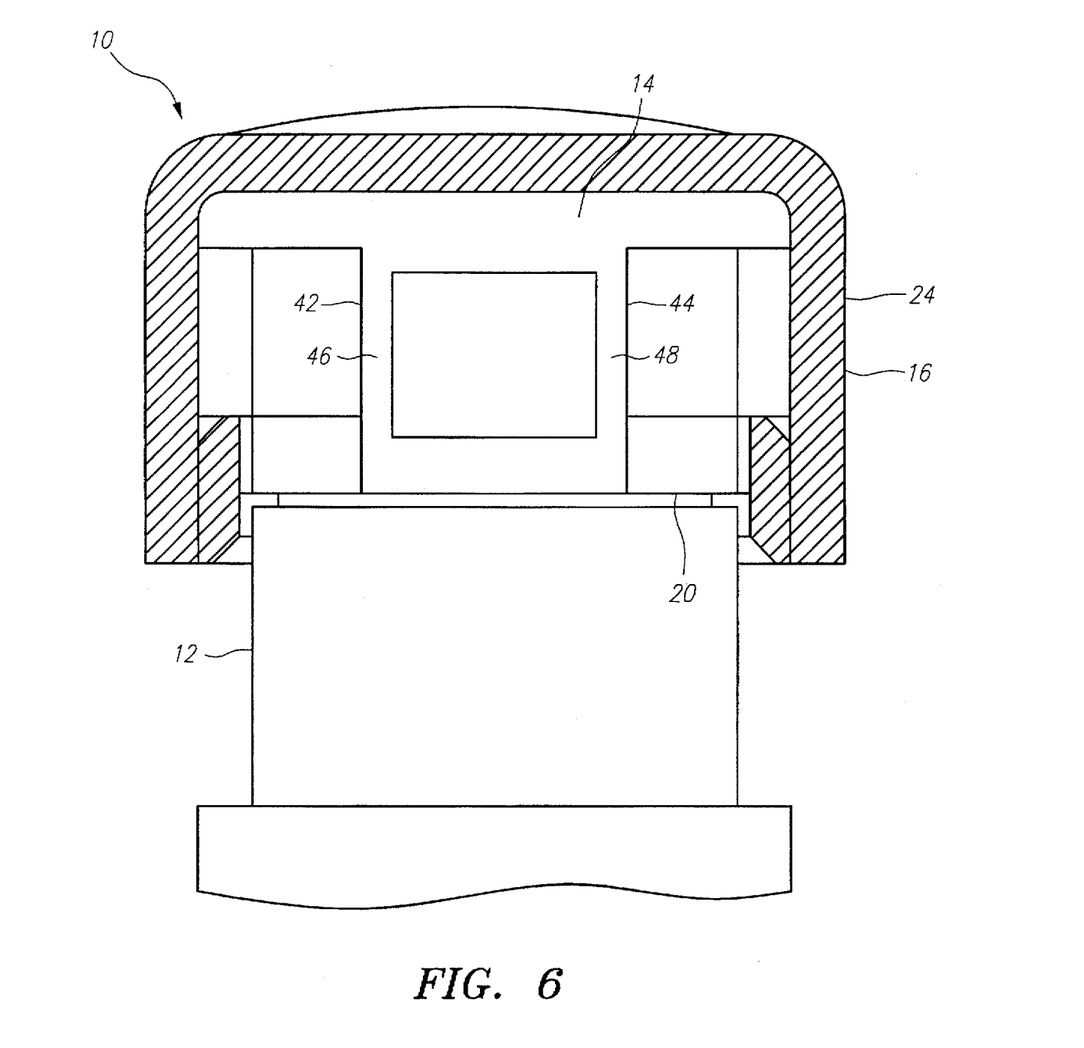
FIG. 6 is a cross-sectional view from the back end of the apparatus of FIG. 1.

In a preferred embodiment of the invention, the valve 12 is used with a bottled water cooler and the valve stem 18 is manually moved from a closed position disabling water flow to an open position enabling water flow. Preferably, as known in the art, the valve stem 18 is a threaded rod encircled by a torsion spring and having an upstanding, externally threaded portion to receive a cap. The valve stem 18 is spring biased toward the closed position. The valve 12 also includes an upper surface 20, which as shown in FIGS. 1, 2, and 6, has a flat, annular shape.

The actuator cap 14, as shown in FIG. 1, is mounted to the movable valve stem 18 of the valve 12. Preferably, the actuator cap 14 is made of plastic and adapted so as to be screwed on to the movable valve stem 18. The actuator cap 14 may be colored red for use with a hot water dispenser.

Referring to FIGS. 1, 2, 3, 5, and 6, the hood assembly 16 is mounted over the actuator cap 14 to slide in a direction perpendicular to the direction of motion of the stem 18 of the valve 12. Thus, the hood assembly 16 can slide from a first position to a second position perpendicularly across the direction of actuation of the valve 12. As most clearly shown in FIG. 5, the hood assembly 16 has at least one downwardly projecting stopper 32. In a preferred embodiment, there are first and second stoppers 32, 34. The stoppers 32, 34 can be of various shapes, but are preferably formed with flat bottom surfaces. The stoppers 32, 34 are positioned to engage the annular upper surface 20 of the valve 12 when the hood assembly 16 is in the first, or disabling, position. As shown, the hood assembly 16 sits above the actuator cap 14 so that the valve is manually actuated by pressing down directly on the hood assembly 16 and thereby indirectly on the actuator cap 14. Thus, when the hood assembly 16 is in the disabling position, the stoppers 32, 34 prevent the stem 18 of the valve 12 from moving in the direction of actuation and actuating the valve 12. When the hood assembly 16 is in the enabling position of FIG. 3, however, the stem 18 of the valve 12 is free to move downward to actuate the valve 12. Like the actuator cap 14, the hood assembly 16 may be colored red for use with a hot water dispenser.

Figure 4:
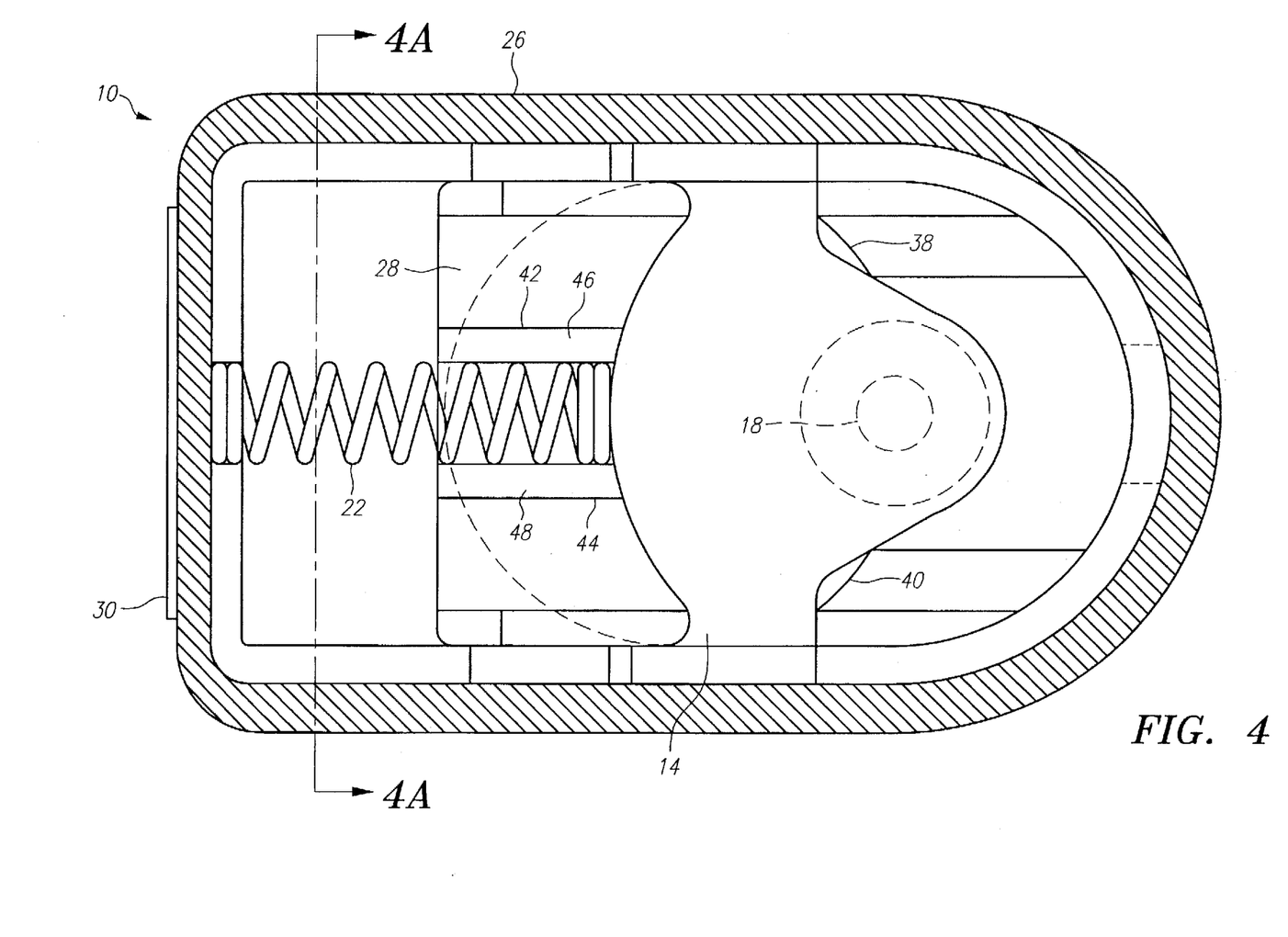
FIG. 4 is a cross-sectional plan view of the apparatus of FIG. 1.
Figure 4A:
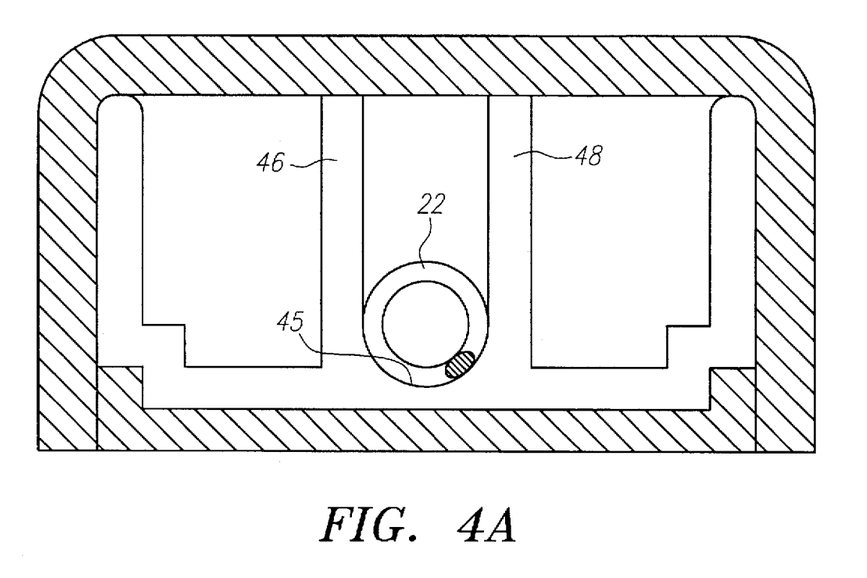
FIG. 4A is a cross-section view taken along line 4A—4A of FIG. 4.

A biasing element or spring 22 is disposed between the actuator cap 14 and the hood assembly 16. The spring 22 is disposed in the direction of sliding motion of the hood assembly 16. Thus, the spring 22 urges the hood assembly 16 to the disabling position. The spring 22 is positioned at one end to a side of the actuator cap 14. As shown in FIG. 4A, the actuator cap 14 has a radiused floor 45, to avoid catching on the spring coils.

Figure 5:
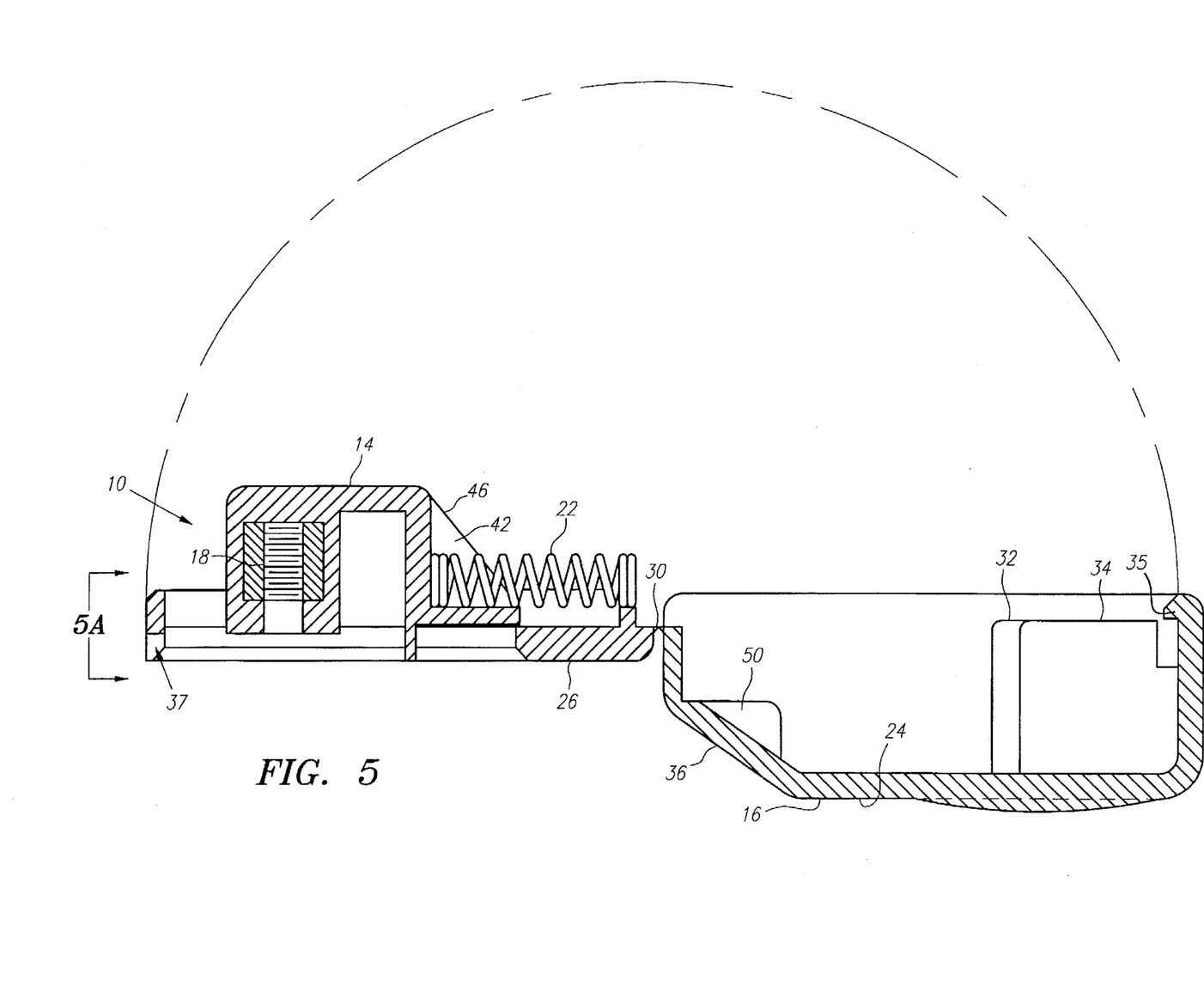
FIG. 5 is a cross-sectional view from the left side of the apparatus of FIG. 1 with the hood assembly in an open position.
Figure 5A:
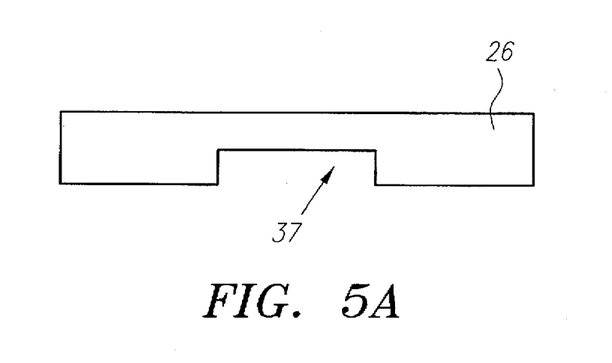
FIG. 5A is a partial end elevation view taken along line 5A of FIG. 5.

Referring to FIGS. 1, 2, and 5, the hood assembly 16 preferably has a top hood 24 connected by a hinge 30 to a lower tongue 26. As shown in FIG. 4, the lower tongue has a slot 28 therein. The lower tongue 26 rests under the actuator cap 14, with the valve housing projecting upwardly through the slot 28. The slot 28 is elongated to allow movement front-to-back of the hood assembly 16 between the disabling and enabling positions. The top hood 24 covers the actuator cap 14 and serves as a button for manual actuation of the valve 12. Preferably, as shown in FIGS. 1, 2, and 5, the top hood 24 includes a sloping surface 36.

With reference to FIG. 4, the actuator cap 14 includes first and second spaced apart grooves 38, 40 to engage and slidably hold the downwardly projecting stoppers 32, 34 of the top hood 24. Although two stoppers and two grooves are depicted in the preferred embodiment, the scope of the invention is not limited to any particular number and a variety of numbers could be accommodated.

Referring again to FIG. 4, the actuator cap 14 preferably includes first and second upstanding tabs 42, 44 positioned on opposing sides of the biasing element 22. The upstanding tabs 42, 44 serve to orient the biasing element 22 in the direction of motion of the hood assembly 16. The upstanding tabs 42, 44 have sloping edges 46, 48 to engage the inside of the sloping surface 36 of the top hood 24. Likewise, with reference to FIGS. 1, 2, and 5, the inside of the sloping surface 36 of the top hood 24 includes at least one inwardly projecting tab 50 to retain the biasing element 22 in a fixed orientation.

As shown in FIGS. 2 and 3A, the top hood 24 has a latch 35 that snaps into a slot 37 on the lower tongue 26. Once snapped into place, the top hood 24 cannot be easily removed, to prevent tampering.

In operation the child resistant valve assembly 10 is used on a hot water or other liquid dispenser 56 connected to a container 58 as shown in FIG. 1. A person desiring, e.g., hot water pushes on the sloping surface 36 of the top hood 24 in a general direction toward himself or herself. This causes the hood assembly 16 to travel from the disabling position to the enabling position of FIG. 3. As shown, when the hood assembly 16 reaches the enabling position, the stoppers 32, 34 are no longer positioned directly above the annular upper surface 20 of the valve 12. The hood assembly 16, actuator cap 14, and valve stem 18 then move downward in unison because the stoppers 32, 34 can no longer prevent it. This allows hot water to flow from the bottled water cooler 58 through the dispenser 56.

In contrast, if a child simply pressed down on the hood assembly 16 in the disabling position without first pulling the hood assembly 16 outward to the enabling position, the stoppers 32, 34 would contact the annular upper surface 20 of the valve 12. This would prevent downward movement of the valve stem 18 and hence preclude actuation of the valve 12. Thus, hot water could not escape the dispenser 56 and injure the child.

While preferred embodiments have been shown and described, numerous alterations may be made without departing from the spirit or scope of the invention. Therefore, the invention is not to be limited except in accordance with the following claims.

What is claimed is:

1. A child resistant valve assembly, comprising:
 a valve having a valve stem movable in a direction of from a closed position to an open position, the valve stem biased toward the closed position;
 an actuator cap mounted to the valve stem of said valve, said actuator cap including at least one groove disposed in a direction generally perpendicular to the direction of actuation;
 a hood assembly slidably mounted over said actuator cap and movable in a direction generally perpendicular to the direction of actuation between a disabling position and an enabling position, said hood assembly including at least one stopper adapted to slidably engage the at least one groove of said actuator cap, said at least one stopper serving to contact a surface of said valve when said hood assembly is in the disabling position to prevent actuation of said valve, said at least one stopper slidably movable out of contact with said valve such that at least a portion of said at least one stopper slidably disengages from the as least the at least one groove when said hood assembly is moved to the enabling position to allow actuation of said valve; and
 a biasing element disposed between said hood assembly and said actuator cap, said biasing element urging said hood assembly toward the disabling position.

2. The child resistant valve assembly of claim 1, wherein said biasing element is a coil spring.

3. The child resistant valve assembly of claim 1, wherein said biasing element is connected to said actuator cap.

4. The child resistant valve assembly of claim 1, wherein said hood assembly and said actuator cap are made of plastic.

5. The child resistant valve assembly of claim 1, wherein said hood assembly further includes a sloping surface.

6. The child resistant valve assembly of claim 1, wherein said actuator cap comprises at least one groove to slidably hold the at least one stopper of said hood assembly.

7. The child resistant valve assembly of claim 1, wherein said hood assembly further comprises a lower tongue and a top hood incorporating said sloping surface and integral to the at least one stopper, said lower tongue attached to said top hood by a hinge.

8. The child resistant valve assembly of claim 7, wherein said lower tongue of said hood assembly defines a slot encircling said valve.

9. The child resistant valve assembly of claim 7, wherein said top hood includes at least one tab projecting inwardly from said sloping surface.

10. The child resistant valve assembly of claim 7, wherein said actuator cap further comprises a plurality of upstanding tabs having sloping edges to engage the inside of said sloping surface of said hood assembly.

11. A child resistant valve assembly, comprising:
 a valve leaving a valve stem movable in a directing of actuation from a closed position to an open position, the valve stem biased toward the closed position;
 an actuator cap threadedly mounted to the valve stem of said valve;
 a top hood slidably mounted over said actuator cap and movable in a direction generally perpendicular to direction of actuation between a disabling position and an enabling position, said top hood including at least one inwardly projecting stopper which movably engages said actuator cap and abuts surface of said valve when said top hood is in disabling position to prevent actuation of said valve, said at least one stopper movable out of contact with said valve such that at least a portion of said at least one stopper slidably disengages from said actuator cap when said top hood is moved to the enabling position to allow actuation of said valve;
 a lower tongue hingeably connected to said top hood defining a slot encircling said valve; and
 a spring connected to a side of said actuator cap and disposed between said actuator cap and an inner surface or said top hood to urge toward the disabling position.

12. The child resistant valve assembly of claim 11, wherein said upper hood further comprises a sloping surface.

13. The child resistant valve assembly of claim 11, wherein said top hood further comprises at least one inwardly projecting tab, and said actuator cap comprises first and second upstanding tabs and first and second grooves adapted to slidably engage the first and second stoppers of said top hood, said first and second grooves being disposed in a direction generally perpendicular to the direction of actuation.

14. A bottled water cooler assembly, comprising:
   a bottled water cooler;
   a dispenser connected to said bottled water cooler;
   a valve connected to said dispenser and having a valve stem movable in a direction of actuation from a closed position to an open position, valve stem biased toward the closed position;
   an actuator cap mounted to the valve stem of said valve actuator cap including at least one groove disposed in a direction generally perpendicular to the direction of actuation;
   a hood assembly slidably mounted over said actuator cap and movable in a direction generally perpendicular to the direction of actuation between a disabling position and an enabling position, said hood assembly including, at least one stopper adapted to slidably engage the at least one groove of said actuator cap, said at least one stopper serving to contact a surface of said valve when said hood assembly is in the disabling position to prevent actuation of said valve, said at least one stopper slidably movable out of contact with said valve such that at least a portion of said at least one stopper slidably disengages from the at least one groove when said hood assembly is moved to the enabling position to allow actuation of said valve; and
   a biasing element disposed between said hood assembly and said actuator cap, said biasing element urging said hood assembly toward the disabling position.

* * * * *